United States Patent [19]

Johnson

[11] Patent Number: 4,876,460
[45] Date of Patent: Oct. 24, 1989

[54] UNINTERRUPTED POWER SUPPLY

[75] Inventor: Ronald W. Johnson, Laguna Hills, Calif.

[73] Assignee: Intellipower, Inc., Laguna Hills, Calif.

[21] Appl. No.: 329,194

[22] Filed: Mar. 27, 1989

[51] Int. Cl.[4] .......................... H02J 9/06; H02M 5/45
[52] U.S. Cl. ........................................ 307/64; 307/86; 363/37; 363/39
[58] Field of Search .................... 307/48, 64, 66, 86, 307/88; 363/37, 89, 124, 39, 95, 97

[56] References Cited

U.S. PATENT DOCUMENTS

| | | | |
|---|---|---|---|
| 4,122,359 | 10/1978 | Breikss | 307/64 |
| 4,388,706 | 6/1983 | Butler | 307/64 |
| 4,521,672 | 6/1985 | Fronius | 363/95 |
| 4,626,978 | 12/1986 | Thouvenin | 363/37 |
| 4,692,854 | 9/1987 | Baxter, Jr. et al. | 363/41 |
| 4,728,808 | 3/1988 | Bet-Esh et al. | 307/64 |
| 4,779,007 | 10/1988 | Schlanger et al. | 307/64 |
| 4,827,151 | 5/1989 | Okado | 363/37 |

*Primary Examiner*—Peter S. Wong
*Attorney, Agent, or Firm*—Stetina and Brunda

[57] ABSTRACT

A continuous uninterrupted power supply (UPS) having microprocessor control DC circuitry is disclosed. The UPS comprises a regulator for converting an AC line signal to a regulated DC signal. The regulator may include an AC/DC converter connected to an AC input line for converting the AC input signal for generating a DC signal from an AC input signal. A filter circuit is provided within the regulator for filtering the converted DC signal. A backup DC source and a series diode are also provided within the regulator for connecting a backup source to the converted DC signal when the DC signal is less than a predetermined signal level. A DC/DC converter is provided within the regulator for controlling the converted DC signal level. A DC/AC converter is connected to the regulator for receiving the regulated DC signal and generating an output AC signal therefrom. A microprocessor controller regulates the operation of the DC/AC converter. The microprocessor controller is connected to the DC/AC converter by means of a plurality of control line pairs, each control line pair including an unfiltered control line and a return line disposed proximate thereto.

18 Claims, 4 Drawing Sheets

PRIOR ART

UNINTERRUPTED POWER SUPPLY

BACKGROUND OF THE INVENTION

The present invention relates to uninterrupted power supplies (UPS) and, more particularly, to a microprocessor controlled UPS wherein the microprocessor is disposed proximate the output switching circuit and is directly connected thereto.

The power supply regulators are commonly available from a variety of different sources. The most common of such devices operate to protect the connected circuit from surges in the AC power line. Such devices are limited to filter circuits disposed intermediate the AC input and the protected devices. More sophisticated circuits supplement the filter circuitry through the use of varistors, gas tubes and/or semi-conductor devices to provide greater surge protection. However, such devices do not provide means to supplement the AC input in the event that the line voltage drops below the optimum level.

Other contemporary devices extend beyond the contemporary surge protectors, providing circuitry that permit supplementing the AC input line when it drops below an optimum level. Such devices are generally of two types. The first type is commonly referred to as a standby UPS. This term is used for a UPS which provides a backup AC signal that may be interjected to the line when the line signal drops below an optimum level. One common shortcoming of such devices relates to the delay period between the time the line signal drops below the optimum level and the time that the standby AC signal is connected to the line. The resulting delay may be one cycle or less. However, where the line is connected to sensitive equipment, such as computers, the loss of even one cycle of input power can be devastating. For example, at certain times, such as when a computer is writing to a disk, the loss of power may result in significant loss of data.

A second type of UPS that permits supplementing the AC line signal, is commonly referred to as a continuous UPS. This term refers to a circuit wherein the AC line signal is converted to a DC level and later converted back to an AC signal. The backup power is supplied as a DC source, rather than an AC source as in the case of the standby UPS. The backup DC source, commonly a battery, is generally connected to the converted DC line voltage in the manner of such that when the converted DC line voltage drops below a threshhold level the backup source is connected to the line to maintain the voltage at the optimum level. An advantage of such continuous UPS devices relates to eliminating the time delay associated with the standby UPS. Because the connection between the backup DC source and the converted DC line may be effected by means of a simple diode, no inherent switching delay need occur before the backup DC source supplements the converted DC line voltage level.

One common shortcoming of continuous UPS circuits arises in connection with the switching necessary to convert the converted DC level back to an AC signal. In view of the current and voltage levels passing through the circuit the switching circuit, e.g bridge circuitry, typically generates spurious interference signals that may be induced into the switch control circuit. One common means of accommodating such spurious signals is the use of interface circuits intermediate the bridge switching circuit and the control circuit that regulates the bridge switching. The use of such interface circuitry and the need to isolate switching control circuitry from the switching circuit typically results in location of the switching control circuitry, e.g. the microprocessor, at a location remote from the switching circuitry. Consequently, the physical layout of the circuit is such that the controller is generally located on a separate card, isolated from the switching circuit by both physical distance and by means of an interface circuit.

The present invention is directed to a continuous UPS wherein the advantages of microprocessor control over the switching circuit and other circuit functions are implemented without the need to isolate the microprocessor either physically or electrically from the switching circuit. The present invention also provides for unique means for generating and controlling the UPS output signal.

SUMMARY OF THE INVENTION

A continuous uninterrupted power supply (UPS) having microprocessor control circuitry is disclosed. The UPS comprises a regulator for converting an AC line signal to a regulated DC signal. The regulator may include an AC/DC converter connected to an AC input line for converting the AC input signal to a DC signal. A filter circuit is provided within the regulator for filtering the converted DC signal. A backup DC source and a series diode are also provided within the regulator for connecting a backup source to the converted DC signal when the DC signal is less than a predetermined signal level. A DC/DC converter is provided within the regulator for controlling the converted DC signal level. A DC/AC converter is connected to the regulator for receiving the regulated DC signal and generating an output AC signal therefrom. A microprocessor controller controls the operation of the DC/AC converter. The microprocessor controller is connected to the DC/AC converter by means of a plurality of control line pairs, each control line pair including an unfiltered control line and a return line disposed proximate thereto.

The invention permits the microprocessor controller to be disposed in the same general region, i.e. on the same card, as the DC/AC converter, thus avoiding the need for interface circuits and/or the need to physically isolate the microprocessor controller from the DC/AC converter. Spurious signals generated by the DC/AC converter do not impede the operation of the microprocessor controller.

In the presently preferred embodiment the control line pairs comprise an unfiltered control line and a return line spaced by approximately 0.025 inches along the entire length thereof.

The microprocessor is preferrably implemented as a single chip microprocessor disposed on the same card as the DC/AC converter. Various criteria may be programed within the microprocessor to govern operation of the circuit.

Voltage clamping circuitry may be provided for regulating the DC voltage level communicated to the DC/AC converter. Current limiting circuitry may also be provided for limiting the current of the regulated DC signal.

The microprocessor is operative to track the frequency of the AC line signal and control the operation of the DC/AC converter in response thereto. The microprocessor phase locks the operation of the DC/AC converter to the AC signal line. The microprocessor is preferably further operative to hold supply signals to the DC/DC converter and DC/AC converter to substantially zero levels until such time as the microprocessor has initialized selected UPS circuits. The microprocessor is preferably further operative to disable supply signals to the DC/DC converter and DC/AC converter upon the occurrence of predetermined signal conditions in the UPS circuit.

DETAILED DESCRIPTION OF THE DRAWINGS

The detailed description as set forth below is intended merely as a description of the presently preferred embodiment of the invention, and is not intended to represent the only form in which the present invention may be constructed or utilized. The description below sets forth the functions in sequence of signals that are affected by the invention in connection with the illustrated embodiment. It is to be understood, however, that the same, or equivalent functions or signal sequences may be accomplished by different embodiments that are also intended to be encompassed within the spirit and scope of the invention.

Figure 1:
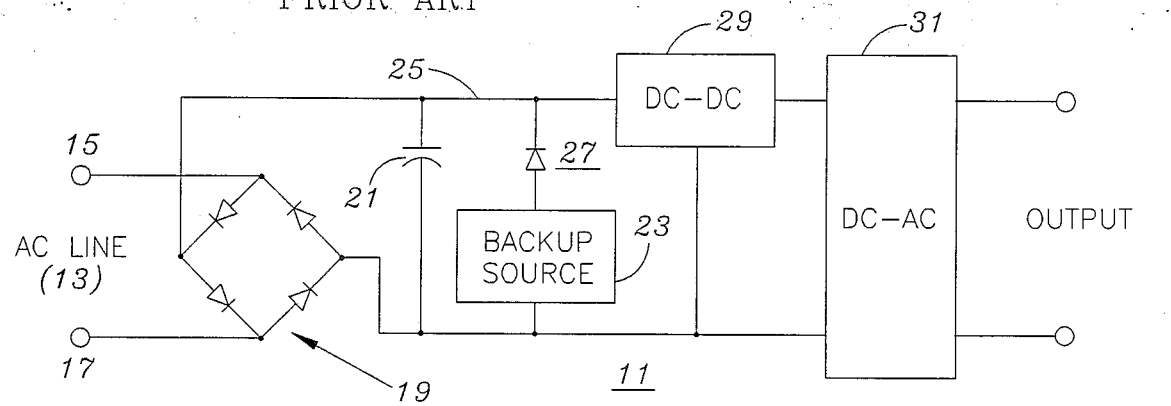
FIG. 1 is a schematic representation of prior art of a contemporary UPS circuit.

FIG. 1 illustrates a conventional UPS for providing a continuous AC output signal. The circuit 11 is connected to AC line 13 via terminal 15, 17. The AC input signal is communicated to bridge 19 which converts the AC line signal to a DC signal level. Capacitor 21 operates to filter the DC signal output from bridge 19. Backup source 23, typically a battery, is connected to DC signal line 25 via diode 27. The diode 27 is forward biased when the level of DC signal communicated through DC line 25 drops below a preset level. At the time diode 27 becomes forward biased backup source 23 is placed in communication with the DC signal line 25. Thus, the signal level communicated through DC line 25 is maintained at a substantially constant level.

DC/DC converter 29 operates to further regulate the DC signal communicated through DC line 25. The DC/DC converter generates a regulated DC output signal which is communicated to DC/AC converter 31. The DC/AC converter 31 is typically a bridge circuit that is switched in a manner to follow the AC input signal. Consequently the output from the DC/AC converter 31 substantially follows, and supplements as necessary, the AC line signal.

Figure 2:
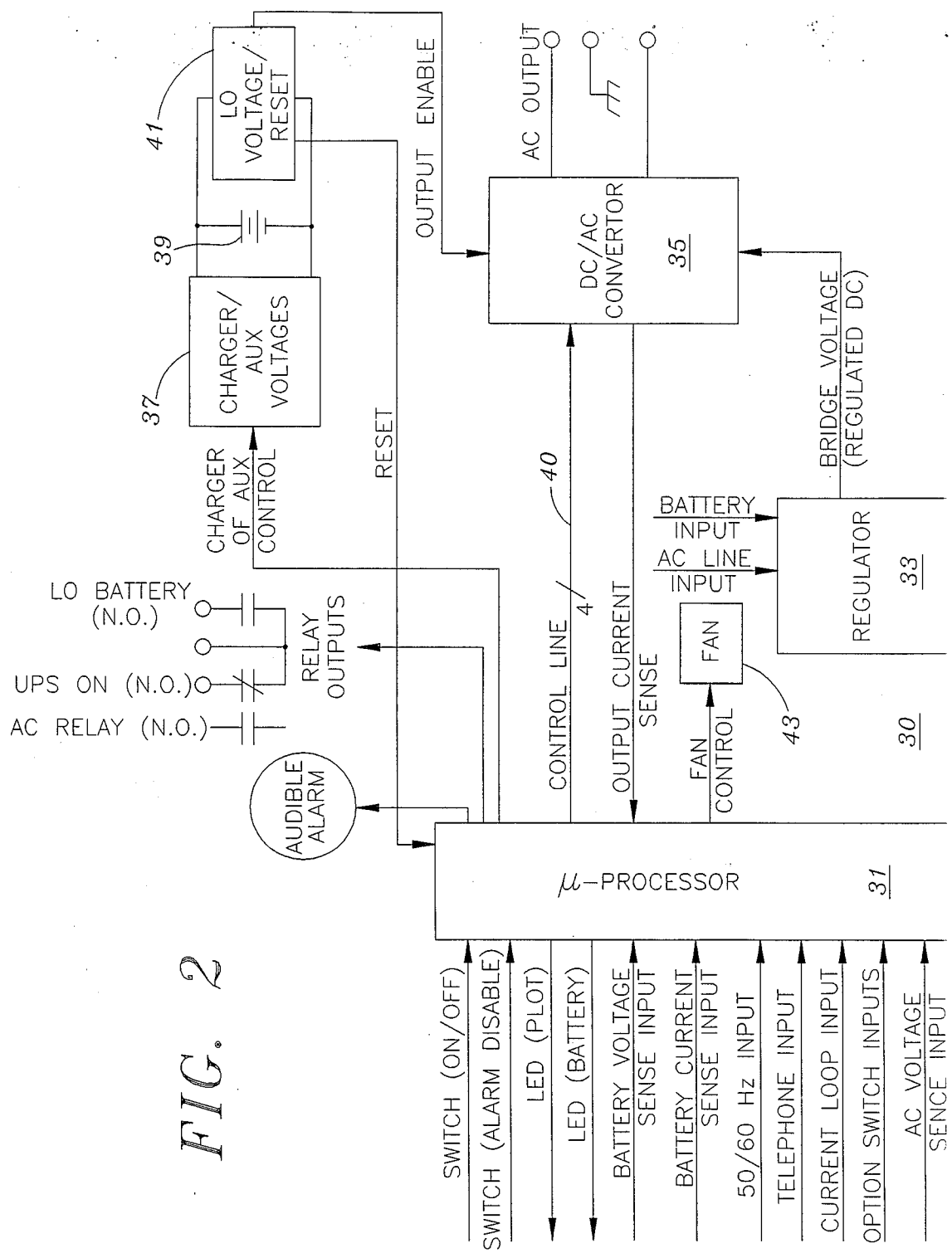
FIG. 2 is a block diagram representation of a portion of the present UPS generally showing the means for control of the DC/AC converter.

FIG. 2 is a block diagram representation of a UPS control circuit 30 in accordance with the present invention. The circuit comprises microprocessor 31, regulator 33 and DC/AC converter 35. The microprocessor 31 is preferably implemented as a conventional 8051 microprocessor. Intel, Signetics, Matra, are several manufacturers. The regulator 33 generally operates in accordance with prior art circuits and performs the functions of AC to DC conversion, DC filtering, connection of the backup battery source as necessary, and DC to DC conversion. Consequently, the broad function of regulator 33 is substantially identical to the combined functions of AC/DC converter 19, filter 21, diode 27 and DC/DC converter 29 (FIG. 1). The output of regulator 33 is a regulated DC signal which is communicated to the DC/AC converter 35. The DC/AC converter 35 comprises a plurality of switching elements which are operated by the microprocessor 31 in response to the AC line signal and other sensed conditions within the UPS circuit. The means by which microprocessor 31 controls the operation of DC/AC converter 35 is by a plurality of control line pairs communicate control signals from the microprocessor 31 to the DC/AC converter 35. The construction of the control line pairs is illustrated more specifically at FIG. 3. Generation and regulation of the control signals is reviewed in more detail below.

The microprocessor 31 also regulates the operation of charger/auxiliary voltage unit 37. The charger 37 operates to maintain battery 39 (which provides the back-up DC supply) in a charged condition and, in conjunction with battery 39, provides power for the operation of low voltage reset 41. Low voltage reset 41 operates to enable DC/AC converter 35 as long as the input voltage levels to low voltage/reset 41 remain above a predetermined threshhold. The low voltage reset 41 also operates to generate a reset signal to the microprocessor when the voltage levels drop below a predetermined level.

Various other signals are input or output from the microprocessor 41. The specific signals are described in more detail in connection with FIGS. 4 and 5. FIG. 2 generally represents a limited number of those signals in connection with the illustrated modules. The inputs to microprocessor indicate sensed conditions, such as when the UPS is turned on, when the audible alarm is disabled, the battery voltage level, the battery current level, 50/60 hertz timing signal, telephone input, current loop input, AC voltage sense input and DC/AC converter 35 output current sense. In addition to the output signals previously described, microprocessor 31 generates a fan control output to regulate the operation of fan 43. The microprocessor may also generate an audible alarm output when certain alarm threshhold conditions are detected. Other outputs are connected through relays to indicate the status of various portions of the UPS circuit.

Figure 3:
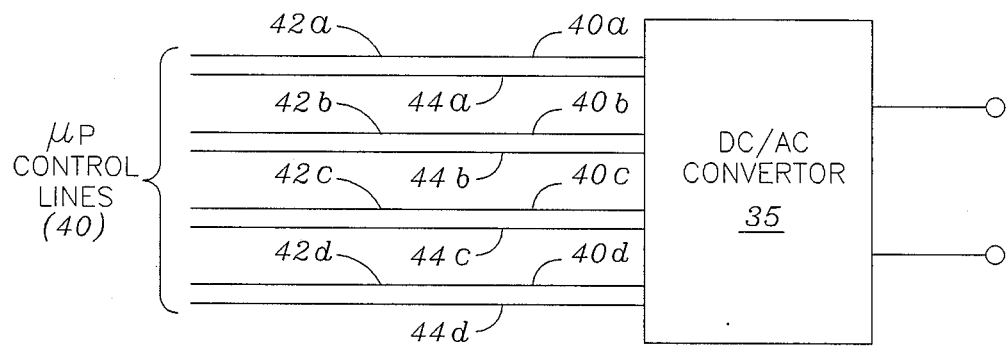
FIG. 3 is a block diagram illustrating the physical wiring connections between the microprocessor and the DC/AC converter.

FIG. 3 illustrates in more detail the structure of microprocessor control line pairs 40 which connect the microprocessor 31 to the DC/AC converter 35. In order to appreciate the significance of FIG. 3 it is useful to consider the physical wiring arrangement that is normally exhibited in continuous UPS circuits. Normally, the connections between the microprocessor, or other control circuitry and the DC/AC converter comprise a plurality of individual control lines, e.g. metalic traces, unaccompanied by ground or other return lines. The return line is typically formed as a thicker metalic trace formed elsewhere on the circuit board and connected to a variety of other components. Thus, the return line typically is laid out in a different direction than the signal lines communicating control signals from the microprocessor to the DC/AC converter.

In view of the voltage and current levels at which the DC/AC converter operates, the switching action may commonly result in the generation of spurious signals that are induced into various portions of the UPS circuit. Such spurious signals may result from the high flux levels associated with magnetic components and large electromagnetic fields which are thereby generated. Where such signals are induced into the control lines connecting the microprocessor to the DC/AC converter the spurious signals may cause problems in operation of the microprocessor. These may be manifested as a variety of undesirable conditions in the circuit which impede the proper operation of the UPS.

It has been determined that the location of a return line in the immediate proximity of the control line has the desirable effect of eliminating many potential harmful effects of such induced signals. More specifically, the use of an adjacent return line has the effect that spurious electromagnetic fields emanating from the power switching circuits (along with interconnecting wiring and magnetic components) cannot induce voltages in the control line alone. The spurious fields can only induce a voltage which is common to both the control line and the associated return line. In this manner, the resulting spurious signals become common mode, i.e. common to signal and return line, and therefore do not interfere with the microprocessor or associated circuitry.

FIG. 3 illustrates a circuitry wherein each control line pair, i.e. 40a, 40b, 40c, 40d consists of a control line, e.g. 42a, 42b, 42c, 42d and an associated return line, e.g. 44a, 44b, 44c, 44d. In the presently preferred embodiment each control line is disposed adjacent the associated return line, with the edges of control lines and return lines spaced approximately 0.025 inches from each other. The thickness of the control lines and the return lines is typically formed to be approximately 0.012-0.013 inches wide in the presently preferred embodiment.

Contemporary microprocessor UPS circuits are distinguishable from the arrangement depicted at FIG. 3 in that such circuits utilize a common return line, as discussed above, and address the interference problem by means of filter circuits disposed intermediate the microprocessor and the DC/AC converter. Moreover, the microprocessor is typically disposed at a physically separate site, e.g. on a separate card, to further avoid or mitigate the effects of spurious signals on the operation of the microprocessor.

Figure 6:
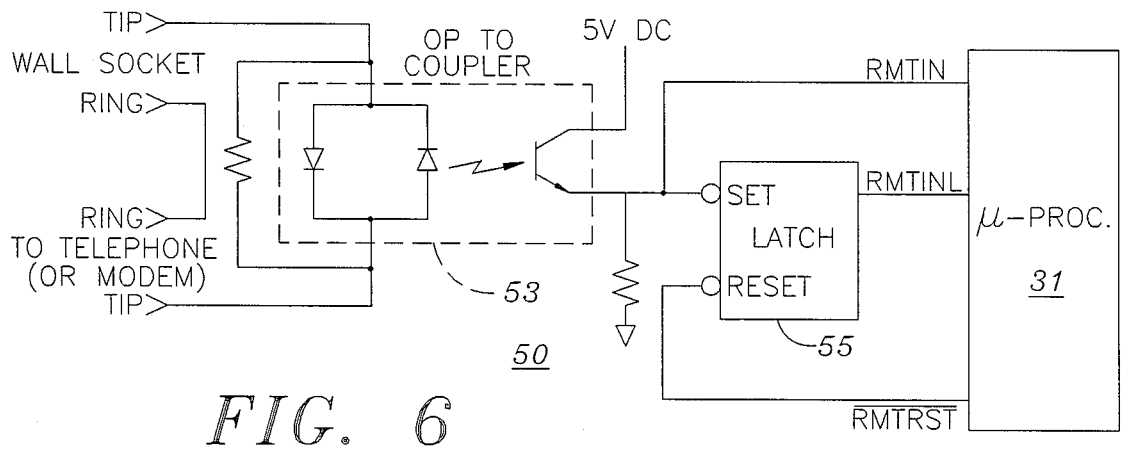
FIG. 6 is a schematic diagram illustrating the operation of the modem circuit.
Figure 4:
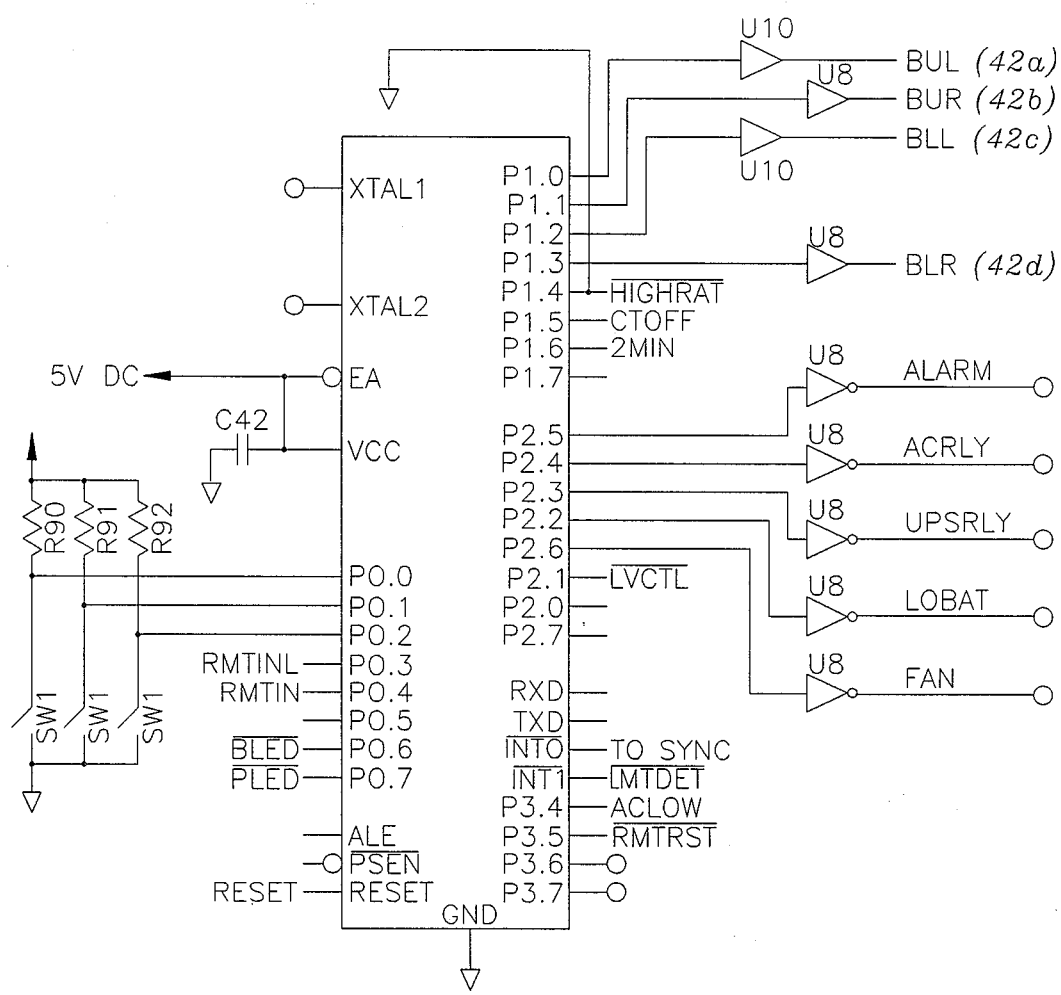
FIG. 4 is a block diagram representation of the microprocessor, showing the signals driving and generated by the microprocessor.
Figure 5:
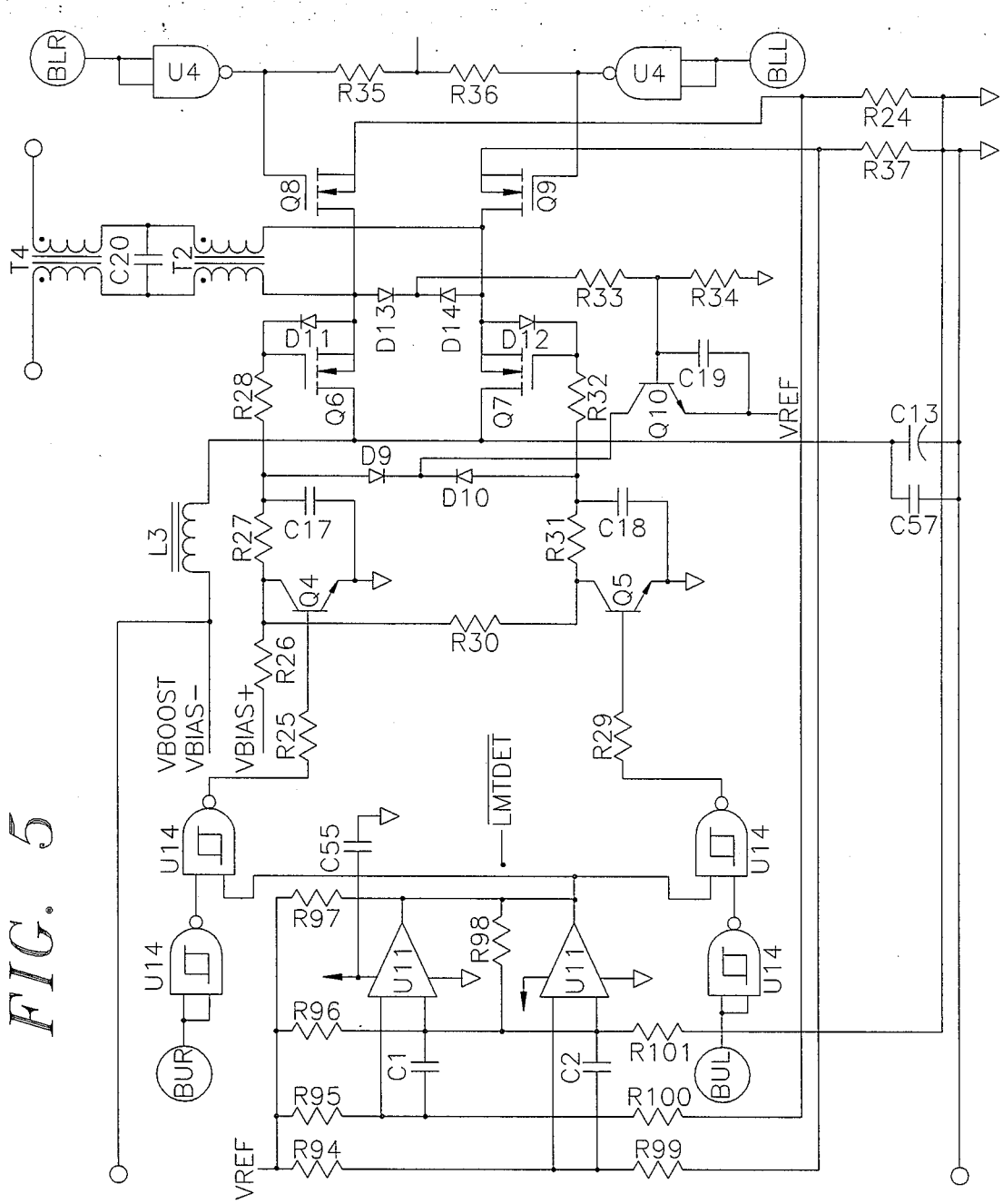
FIG. 5 is a schematic diagram illustrating the operation of the DC/AC converter.

FIGS. 4, 5 and 6 are schematic representations showing in greater detail portions of the presently preferred embodiment of the invention. FIG. 4 illustrates the connection of the microprocessor 31 to supply and control circuits. The microprocessor receives an input timing signal through inputs XTAL 1 and XTAL 2. In the presently preferred embodiment the timing is provided by a 7.3728 megahertz crystal. The microprocessor operates to generate low voltage (e.g. 5v) supply signals which are communicated to other circuits of the UPS. The signal HIGHRAT is communicated to the battery charger/auxilliary voltage circuit 41 (FIG. 2) and is used to indicate whether the batter is being charged in a high rate mode, meaning that the battery has been substantially discharged. The signal CTOFF indicates that the battery is in the lowest possible voltage state where it can sustain output and power, and must be turned off at that time to preclude damage to the batteries. The microprocessor senses that condition and disables the power. The ALARM signal is used to enable the audible alarm, indicating that undesirable conditions have been detected within the UPS circuit. The ACRLY and UPSRLY signals are used to operate the AC and UPS relays, respectively. The AC relay closes when the power on switch is activated, and avoids the need to separately turn on connected AC operated devices. The UPS relay is a closure that is supplied for a computer interface. In the presently preferred embodiment the UPS remains normally closed. However, if the UPS is operated on battery, instead of AC input, the UPS relay will then open as an indication that power is being drawn from the backup power source. The LOBAT signal is used an indication of low battery condition. In the presently preferred embodiment the LOBAT signal generates a continuous alarm sound, indicating that power failure is imminent, i.e. about two minutes of power are remaining. The FAN signal is used to regulate the operation of the fan 43. The signal LVCTL is used to regulate the low voltage control circuit to preclude generation of a low voltage supply until the circuit has been initialized. LMTDET is used to disable the bridge drive circuit when an overload condition is sensed. The signal AC LOW indicates that the AC line level is low, and is used to determine whether or not the UPS is operating from AC voltage or from the battery source. The signal RMTRST is used to reset the RMT circuit. The signals BLED and PLED are used to indicate the charge state of the battery, as well as whether the UPS is operating on battery, or input power, respectively.

FIG. 5 illustrates the operation of the DC/AC converter 35. DC/AC converter 35 functions to operate a switching circuit in accordance with the control signals from the microprocessor. Signals from the microprocessor, identified as BUR, BUL, BLR and BLL are communicated to the switching elements Q6, Q7, Q8 and Q9. The signals BUL and BUR are communicated to serial invertor circuits. The signal LMTDET is a second input to the second of the serial invertor circuits and operates to provide overload protection. The signal VREF (V reference), taken from the switch output circuit, is communicated to a pair of comparitors, U11 and is scaled and used to generate the signal LMTDET. When the U14 invertors determine that the output signal exceeds a predetermined threshhold, the LMTDET signal functions to preclude the low voltage BUR and BUL signals from being communicated to the bridge drive circuit. The invention thus provides a particular method to apply control voltage to the DC/AC converter. Power is applied to the circuitry before an output is enabled. Similarly, power is removed from the circuitry before the output is disabled.

The output from the U14 invertors is communicated to duplicate bridge drive circuits operative to translate the 5 volt signals from BUR and BUL to 200 volt signals used to drive the bridge circuit. The bridge drive circuits are in turn connected to the switching circuit including Q6, Q7, Q8 and Q9. Other inputs to the switching circuit from the microprocessor are identified as BLR and BLL. Those signals are communicated to Q8 and Q9 through the U4 invertors.

The output from the switching circuit is communicated to the transformer T2. The output from transformer T2 is thereafter filtered through a capacitor C20 and differential choke T4, with outputs being taken from terminals of choke T4.

In comparison with contemporary continuous UPS circuits, the present invention avoids the need for filter circuits coupling the microprocessor output to the switching circuit inputs (i.e. to Q8, Q9) and to the bridge drive circuit (i.e. to Q4, Q5). Normally, such contemporary circuits would be characterised by an R-C filter circuit intermediate the U4 invertors and Q8, Q9, and between the U14 invertors and inputs to Q4, Q5. Moreover, the difficulties associated with spurious interference signals would normally require that the switching circuit, i.e. Q6, Q7, Q8, Q9 and associated drive circuitry be disposed in a location physically separate from the microprocessor, i.e. on a separate card. The present invention permits the microprocessor and the control circuit to be disposed on the same card.

FIG. 6 illustrates the operation of the modem circuit 50 which permits operation of the UPS from a remote location. The modem circuit is useful where a user desires to power certain equipment, e.g. a computer from a remote location, while retaining the voltage regulation advantages provided by the UPS. The user may therefore dial in to the system which will permit activation of the UPS and the attached computer via an AC relay. When the phone connection is terminated, the UPS can turn off the attached computer and itself.

The circuit illustrated at FIG. 6 operates to detect both a telephone "ring" signal and the "ON HOOK"/"OFF HOOK" condition.

A bidirectional opto coupler 53, such as GE H11AA1, is wired in series with the incoming phone line for the purpose of detecting current flow in the telephone circuit.

A ringing signal will result in an AC signal at the set input of the latch. The microprocessor program periodically samples the opto coupler output and the latch output. The microprocessor 31 also has the capability of resetting the latch.

An OFF HOOK condition will result in a DC signal at the opto coupler output and the latch will never be set.

A ringing signal is detected by determining that the opto coupler output is on (high voltage) and also determining that the latch has been set (therefore the opto coupler output was, at some previous time, off).

When the described condition (opto coupler ON and latch set) occurs at a predetermined rate for some predetermined length of time, then a ringing signal must be present on the telephone line. When the opto coupler output is continually low, the telephone is ON HOOK. When the opto coupler output is continually high (ON), then the telephone is OFF HOOK. The microprocessor reacts to these conditions to enable the UPS and attached computer when a call is received.

What is claimed is:

1. A continuous uninterrupted power supply (UPS) having microprocessor controlled switching circuitry, comprising:
   a regulator circuit for receiving an AC input line signal and for generating a regulated DC signal therefrom;
   a DC/AC converter connected to said regulator for receiving said regulated DC signal and generating an output AC signal therefrom; and
   a microprocessor controller connected to said DC/AC converter for controlling the operation thereof, said microprocessor being connected to said DC/AC converter by a plurality of signal line pairs, each of said pairs including a control line and a return line, said control line and said return line being disposed in close proximity such that signals induced in said control line are also induced in said return line.

2. The UPS as recited in claim 1 wherein said microprocessor comprises a single chip microprocessor.

3. The UPS as recited in claim 1 wherein said control line and said return line are spaced approximately 0.025 inches from each other.

4. The UPS as recited in claim 1 wherein said signal line pairs are operative to mitigate harmful effects of induced signals on the operation of said microprocessor.

5. The UPS as recited in claim 1 wherein said DC/AC converter and said microprocessor are disposed on a common circuit board.

6. The UPS as recited in claim 1 wherein the proximity between said control line and return line precludes voltages from being induced in the control line alone.

7. The UPS as recited in claim 6 further comprising a plurality of control line pairs interconnecting the microprocessor and the DC/AC converter.

8. A continuous uninterrupted power supply (UPS) having microprocessor controlled DC switching circuitry, comprising:
   a regulator circuit for receiving an AC input line signal and for generating a regulated DC signal therefrom, said regulator circuit including:
   (a) line for converting an AC input signal to a converted DC signal;
   (b) a filter circuit for filtering the converted DC signal;
   (c) a backup DC source;
   (d) a diode disposed intermediate the backup source and the converted DC signal for communicating the backup DC source to the converted DC signal when the DC signal is less than a predetermined signal level;
   (e) a DC/DC converter for receiving the converted DC signal and regulating the converted DC signal level;
   a DC/AC converter connected to the regulator circuit for receiving the regulated DC signal and generating an output AC signal therefrom;
   a microprocessor controller for regulating the operation of the DC/AC converter, said microprocessor controller being connected to the DC/AC converter by means of a plurality of control line pairs, each of said control line pairs including an unfiltered control line and a return line disposed proximate thereto.

9. The UPS as recited in claim 8 wherein each of the control line pairs comprise an unfiltered control line and a return line physically disposed approximately 0.025 inches therefrom.

10. The UPS as recited in claim 8 wherein the microprocessor is a single chip microprocessor.

11. The UPS as recited in claim 8 wherein the microprocessor is disposed on the same card as the DC/AC converter.

12. The UPS as recited in claim 8 wherein the DC/DC converter comprises voltage clamping circuitry for regulating the DC voltage level communicated to the DC/AC converter.

13. The UPS as recited in claim 8 wherein the DC/AC converter comprises a bridge circuit.

14. The UPS as recited in claim 8 wherein the DC/DC converter comprises current limiting circuitry for limiting the current of the regulated DC signal communicated to the DC/AC converter.

15. The UPS as recited in claim 8 wherein the microprocessor is operative to track the frequency of the AC input signal and to regulate the operation of the DC/AC converter in response thereto.

16. The UPS as recited in claim 8 wherein the microprocessor is operative to phase lock the operation of the DC/AC converter to the AC input signal.

17. The UPS as recited in claim 8 wherein the microprocessor is operative to disable voltage supply signals to the DC/DC converter and DC/AC converter to substantially zero levels until such time as the microprocessor has initialized selected UPS circuits.

18. The UPS as recited in claim 8 wherein the microprocessor is operative to disable voltage supply signals to the DC/DC converter and DC/AC converter upon occurrence of predetermined signal conditions in the UPS circuit.

* * * * *

UNITED STATES PATENT AND TRADEMARK OFFICE
CERTIFICATE OF CORRECTION

PATENT NO. : 4,876,460

DATED : October 24, 1989

INVENTOR(S) : Ronald W. Johnson

It is certified that error appears in the above—identified patent and that said Letters Patent is hereby corrected as shown below:

Column 8, line 30, after "(a)" please insert --an AC/DC converter connected to an A/C input--

Signed and Sealed this

Second Day of October, 1990

Attest:

HARRY F. MANBECK, JR.

Attesting Officer       Commissioner of Patents and Trademarks